No. 803,987. PATENTED NOV. 7, 1905.
R. A. CARTER.
CHAIN.
APPLICATION FILED DEC. 3, 1904.

WITNESSES:
Herbert Bradley.
Fred Kirchner.

INVENTOR
Robert A. Carter,
by Christy & Christy, Atty's

UNITED STATES PATENT OFFICE.

ROBERT A. CARTER, OF PITTSBURG, PENNSYLVANIA.

CHAIN.

No. 803,987. Specification of Letters Patent. Patented Nov. 7, 1905.

Application filed December 3, 1904. Serial No. 235,407.

*To all whom it may concern:*

Be it known that I, ROBERT A. CARTER, a citizen of the United States, residing at Pittsburg, in the county of Allegheny and State of Pennsylvania, have invented or discovered certain new and useful Improvements in Chains, of which improvements the following is a specification.

In Letters Patent No. 645,202, granted to me March, 13, 1900, I have described and claimed certain improvements in chains, said improvements consisting, as generally stated, in the interposition between interlocking links of a bearing-piece of such character or construction as will reduce the friction of the links one upon the other, and thereby reduce or prevent the wearing away of the links. In the construction shown in said patent the inner walls of the links are grooved for the reception of hardened-steel balls, which facilitate the movements of the links one upon the other and in that way reduce or prevent the wearing away of the links. As in case of the breakage of the balls the edges of the grooves in the links would come into contact and cut into each other, thereby injuring the links and prevent their free movement one upon the other, the object of the present invention is to provide for the insertion of hardened-steel filling-pieces into the grooves in the links, so that interlocking links have rounded hard surfaces for bearings.

The invention is hereinafter more fully described and claimed.

Figure 1:
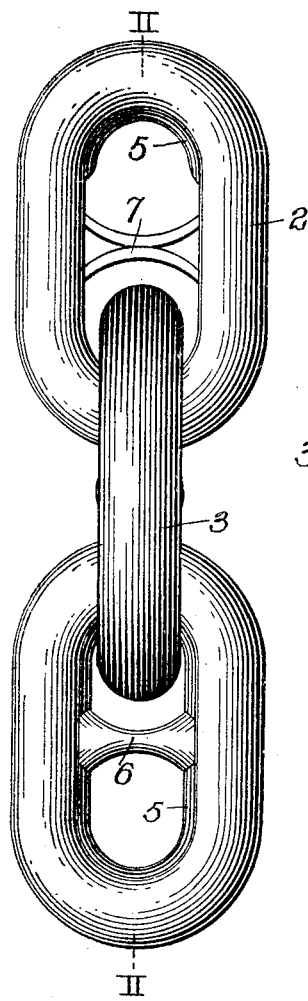
Figure 2:
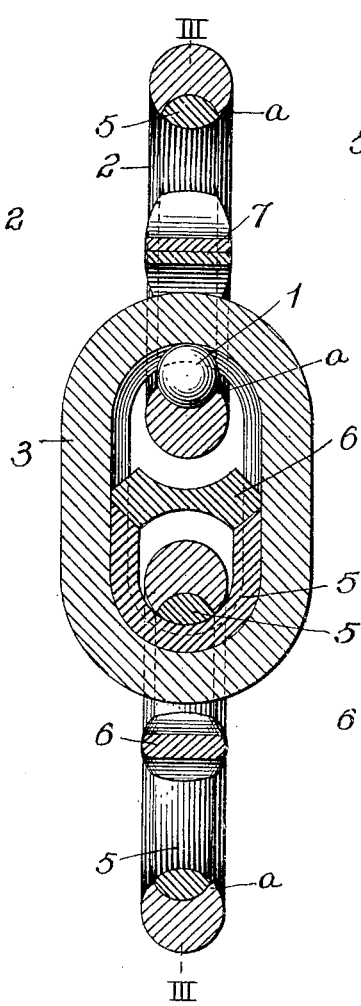
Figure 3:
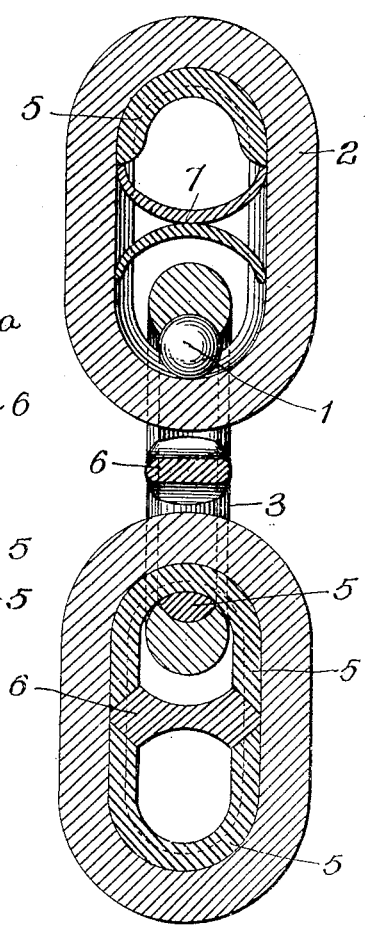

In the accompanying drawings, forming a part of this specification, Figure 1 is an elevation of a portion of a chain embodying my improvement. Fig. 2 is a sectional elevation on a plane indicated by the line II II, Fig. 1; and Fig. 3 is a similar view on a plane indicated by the line III III, Fig. 2.

In the practice of my invention the inner walls of the links are grooved, the bar or blank from which the links are formed being grooved before the blanks are cut, bent, and welded. When a ball 1 is employed to form the bearing between interlocking links 2 and 3, the ball should be placed in position while one of the links is open, as the opening in the link and the thickness of the bar from which the links are formed are so proportioned that one link will not have sufficient movement in the other to permit the ball being moved in or out. In lieu of the ball the bearing-faces of interlocking links may be formed by removable U-shaped pieces 5, which are made of such a size and shape in cross-section as to fill the groove and complete peripheral contour of the link at and adjacent to the ends thereof, although these filling-pieces would probably be held in position by the interlocking, it is preferred to render their remaining in position without liability of distortion by so constructing the ends of the filling-piece and the ends of the stay or strut 6 that the latter overlaps the ends of the U-shaped filling-pieces. As the meeting faces of the filling-piece and stay or strut are inclined, the stay will tend to force the filling-piece to its seat. In case of the breakage of a ball the edges *a* of one link would cut into the corresponding edges of the interlocking link, the links can be protected from injury by the insertion of hardened-steel filling-pieces. This insertion can be effected by knocking out the stay or strut, inserting the filling-piece crosswise, and then turning it around and sliding it into position. The filling-piece is locked in position by a spring stay or strut 7, consisting of curved steel strips arranged back to back. These stays or struts can be sprung into position after the filling-piece has been adjusted to its position.

It will be readily understood by those skilled in the art that chains can be formed of links having the filling-pieces at each end, and in case of wear of the filling-pieces new pieces can be substituted. It will be understood that when filling-pieces are to be inserted the link can be spread out laterally sufficient to permit of the removal of the solid stay or strut and filling-pieces inserted, the stay or strut replaced, and the sides of the link forced back to position.

I claim herein as my invention—

1. In a chain the combination of links having grooved inner walls and U-shaped filling-pieces arranged in the groove at the ends of the links, substantially as set forth.

2. In a chain the combination of links having grooved inner walls, U-shaped filling-pieces arranged in the groove at the ends of the link and a stay or strut for locking the filling-pieces in position, substantially as set forth.

3. In a chain the combination of links having grooved inner walls, a U-shaped filling-piece arranged in the groove at the end of the link and a removable stay or strut, substantially as set forth.

4. A link for chains provided at their ends with internal concave seats and removable U-shaped filling-pieces arranged in said seats, substantially as set forth.

In testimony whereof I have hereunto set my hand.

ROBERT A. CARTER.

Witnesses:
CHARLES BARNETT,
HERBERT BRADLEY.